(No Model.)

F. CURTIS.
METHOD OF SECURING BLOCKS OF PLASTIC MATERIAL WHILE PLANING THEM INTO SHEETS.

No. 387,947. Patented Aug. 14, 1888.

Witnesses,
Robert Sorrett,
P. P. Phillips

Inventor:
Francis Curtis,
By James L. Norris
Atty.

UNITED STATES PATENT OFFICE.

FRANCIS CURTIS, OF NEWBURYPORT, MASSACHUSETTS, ASSIGNOR TO THE ARLINGTON MANUFACTURING COMPANY, OF NEW JERSEY.

METHOD OF SECURING BLOCKS OF PLASTIC MATERIAL WHILE PLANING THEM INTO SHEETS.

SPECIFICATION forming part of Letters Patent No. 387,947, dated August 14, 1888.

Application filed December 12, 1887. Serial No. 257,668. (No model.)

*To all whom it may concern:*

Be it known that I, FRANCIS CURTIS, a citizen of the United States, residing at Newburyport, in the county of Essex and State of Massachusetts, have invented new and useful Improvements in the Method of Securing Blocks of Plastic Material While Planing them into Sheets, of which the following is a specification.

It is the purpose of my invention to provide a suitable method of securing blocks of plastic material upon a sustaining base or movable support during the operation of planing or slicing the block into thin sheets, the invention being especially adapted to the manufacture of celluloid or other compounds of nitro cellulose. Heretofore and prior to my invention this result has been attained by uniting a number of sheets of celluloid in a single mass or block, amalgamating them by means of pressure and heat, and simultaneously forcing the lower portion of the block into grooves in the surface of a plate, whereby the block is secured in place during the process of cutting it into sheets.

It is the purpose of my present invention to wholly do away with the grooved plate or support, and enable the manufacturer to use a perfectly smooth-surfaced plate, whereupon the block is held by atmospheric pressure and adhesion only.

The invention consists, essentially, in the method of securing a block of plastic material upon a support preparatory to cutting it into sheets, said method consisting in molding said block by heat and pressure upon the smooth surface of a suitable bed-plate, whereby the air between said block and plate is practically expelled and the block held upon the surface of said support by atmospheric pressure and adhesion, and forming a flange upon one or more edges of the block, to which pressure may be applied to prevent entrance of air between the block and plate, as hereinafter fully set forth.

Figure 1:
Figure 2:
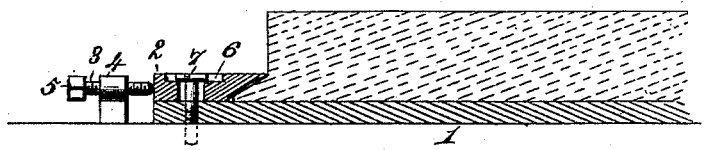
Figure 3:
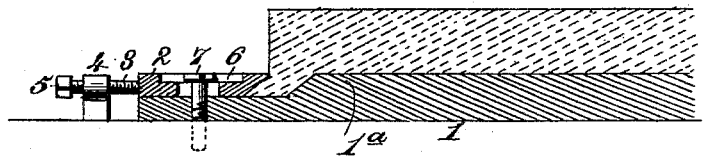
Figure 4:
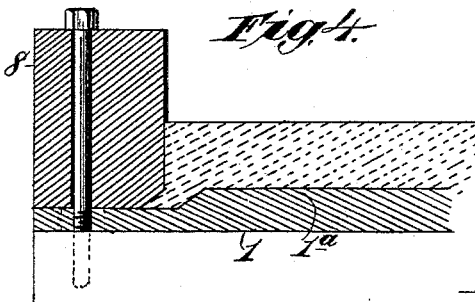

In the accompanying drawings, Figure 1 is a perspective view illustrating one form of apparatus by which the invention may be practiced. Fig. 2 is a vertical section of Fig. 1. Fig. 3 is a sectional view showing a modified form. Fig. 4 is a sectional view showing the manner of preparing and attaching the block.

In practice I proceed substantially as follows:

The numeral 1 in the drawings denotes a bed-plate constructed of any suitable material—such as iron or steel, the latter being preferable—which may be plated with nickel, aluminium, or other metal not subject to oxidation, or with an alloy of such metals. Upon its upper surface this bed-plate is perfectly smooth, and is so constructed that it may be attached to the traveling bed of a planer of the kind usually employed in cutting celluloid blocks into thin sheets.

The plate 1 is provided at or near its ends with clamps 2, which are longitudinally adjustable upon the surface of the plate by means of screws 3, tapped through supports 4, which are swiveled in the bed-plate. These screws rest against the outer edges of the clamps and have angular heads 5, by which they may be turned. The longitudinal movement is provided for by forming slots 6 in each clamp, through which screws 7 pass into the bed-plate, the heads of the screws holding the clamps down, but permitting their adjustment. The inner edge of each clamp is preferably beveled to have an overhanging upper edge, for a purpose to be presently shown.

The celluloid or other plastic block, formed in any suitable manner, is laid upon the surface of the bed-plate, the clamps 2 being removed and chases 8 substituted, as shown in Fig. 4, each chase having its lower inner angle beveled off to correspond substantially with the bevel of the clamps. The bed-plate 1 being placed upon a steam-table and heat and pressure applied in the ordinary manner, portions of the material forming the block are forced into the space between the bed-plate and the beveled edge of the chase, forming a flange, 9, which may extend entirely around the block, although it is only essential that it be formed upon the ends, and it may be confined to one end only. During the operation of molding the block under heat and powerful pressure it will be brought into such intimate contact with the surface of the bed-plate on which it rests that all or substantially all the air between the block and plate will be expelled, forming a practical vacuum. The block will now be held in place by atmospheric pressure added to its natural adhesion. The chases being now removed, the clamps 2 are attached and their beveled edges are forced by the set-screws 3 against the flanges 9, binding the latter down upon the surface of the plate 1, and thereby preventing the entrance of air by the lifting of the edge of the material through shrinkage or other causes. As long as the air can be excluded from entering between the bed-plate and the block the latter will be firmly held by atmospheric pressure and adhesion, and may be cut into sheets in a planer in any suitable manner.

I may raise the supporting portion 1ª of the bed-plate, as shown in Fig. 3, making its surface as high as or even higher than the upper surface of the clamps 2. In this case the flange 9 will project outward and downward, as shown, but will be formed in the same manner and by the same means as already set forth.

The sole function of the clamps 2 is to prevent the edge or edges from being raised and the vacuum thereby broken. The only advantage of employing the modified construction shown in Fig. 3 is that it permits the knife to slice the entire block into sheets, as the planer can then work down to the supporting-surface of the bed-plate.

The use of a grooved plate as heretofore practiced is objectionable for several reasons, that portion of the celluloid forced into the grooves becoming dirty and damaged and unfit to be mingled with clean material. It is therefore put aside among the "scrap," entailing a loss of stock as well as waste of time and labor in removing it from the grooves in the plate. Moreover, as the material shrinks as it cools, it is liable, as the cake or block is cut down, to become less rigid and to pull up from the plate to which it is secured. These objections do not exist in my invention, in which the force bending the block upon the bed-plate is constantly the same, and wherein, also, there need be no waste either of material, time, or labor from the causes mentioned above.

What I claim is—

The process herein set forth, the same consisting in imposing a block of plastic material upon the smooth surface of a suitable bed-plate, applying heat and pressure thereto to expel the air and effect intimate contact, forming a flange upon one or more edges of the block, and applying pressure to said flange or flanges, substantially as described.

In testimony whereof I have affixed my signature in presence of two witnesses.

FRANCIS CURTIS.

Witnesses:
 JOSEPH R. FRANCE,
 THEODORUS VAN WYCK.